(12) United States Patent
Shaw

(10) Patent No.: US 11,070,545 B2
(45) Date of Patent: Jul. 20, 2021

(54) SECURE COMMUNICATION

(71) Applicant: PIKSEL, INC., Wilmington, DE (US)

(72) Inventor: Philip Shaw, York (GB)

(73) Assignee: PIKSEL, INC., Wilmington, DE (US)

( * ) Notice: Subject to any disclaimer, the term of this patent is extended or adjusted under 35 U.S.C. 154(b) by 252 days.

(21) Appl. No.: 15/510,911

(22) PCT Filed: Sep. 11, 2015

(86) PCT No.: PCT/EP2015/070861
§ 371 (c)(1),
(2) Date: Mar. 13, 2017

(87) PCT Pub. No.: WO2016/038200
PCT Pub. Date: Mar. 17, 2016

(65) Prior Publication Data
US 2017/0244699 A1 Aug. 24, 2017

(30) Foreign Application Priority Data

Sep. 11, 2014 (GB) .................................... 1416053

(51) Int. Cl.
| | |
|---|---|
| *H04L 29/06* | (2006.01) |
| *G06F 21/00* | (2013.01) |
| *G06Q 20/42* | (2012.01) |
| *G06Q 20/40* | (2012.01) |
| *G06Q 20/38* | (2012.01) |
| *G06Q 20/12* | (2012.01) |

(52) U.S. Cl.
CPC ....... *H04L 63/0853* (2013.01); *G06Q 20/123* (2013.01); *G06Q 20/382* (2013.01); *G06Q 20/40* (2013.01); *G06Q 20/401* (2013.01); *G06Q 20/42* (2013.01); *G06Q 20/425* (2013.01)

(58) Field of Classification Search
CPC .... H04L 63/0853; G06Q 20/40; G06Q 20/42; G06Q 20/425; G06Q 20/382; G06Q 20/401
See application file for complete search history.

(56) References Cited

U.S. PATENT DOCUMENTS

| | | | |
|---|---|---|---|
| 9,641,521 B2* | 5/2017 | Egan | ................... H04L 63/0853 |
| 2003/0128822 A1 | 7/2003 | Leivo | |
| 2006/0179304 A1* | 8/2006 | Han | ..................... G06Q 20/027 |
| | | | 713/168 |
| 2008/0307515 A1 | 12/2008 | Drokov | |
| 2009/0021350 A1 | 1/2009 | Hatta et al. | |

(Continued)

OTHER PUBLICATIONS

International Search and Written Opinion, dated Dec. 17, 2015, EPO.

(Continued)

*Primary Examiner* — Lisa C Lewis
(74) *Attorney, Agent, or Firm* — Holzer Patel Drennan

(57) ABSTRACT

There is provided a system comprising a first device of a user and a second device of a user, in which a user carries out a secure transaction utilising a user interface of the second device, wherein the secure transaction process sends a request to a user interface of the first device, and authorises or authenticates the transaction in dependence on a response to the request which is not transmitted from a user interface of the second device.

19 Claims, 6 Drawing Sheets

(56) References Cited

U.S. PATENT DOCUMENTS

| | | | | |
|---|---|---|---|---|
| 2009/0049190 A1* | 2/2009 | Jiang | ............ | H04L 51/04 |
| | | | | 709/238 |
| 2013/0040629 A1* | 2/2013 | Sprigg | ............ | G06F 16/9535 |
| | | | | 455/419 |
| 2013/0167215 A1 | 6/2013 | Yang | | |
| 2014/0082707 A1* | 3/2014 | Egan | ............ | H04L 63/0853 |
| | | | | 726/5 |
| 2014/0223520 A1* | 8/2014 | Gafni | ............ | G06F 21/40 |
| | | | | 726/4 |
| 2014/0259190 A1* | 9/2014 | Kiang | ............ | G06F 21/6218 |
| | | | | 726/30 |

OTHER PUBLICATIONS

Examination Report from European Patent Office for corresponding EP application No. 15771526.9, dated Apr. 12, 2019.

* cited by examiner

*Google Glass*

SECURE COMMUNICATION

BACKGROUND

Field of the Invention

The present invention relates to effecting a secure communication utilising the user interfaces of two devices. The invention is particularly but not exclusively concerned with the use of two devices where one device is an accessory to the other device.

Description of the Related Art

It is generally known in the art to utilise interactive devices to conduct secure communication.

An example of a secure communication is a log-on process, where a user has a unique identification which is used for logging-on to a computer device or for logging-on to a service accessed via a computing device.

An example of a secure communication is a transaction process for payment. A credit card, for example, may be used to pay for a service or content utilising a user interface provided at a computing device.

A computing device may be a standard computer or laptop, or may be a suitably adapted television, a tablet or a phone for example. A television may also be connected to a computer device and provide the user interface for the computing device.

It is an aim of the invention to provide an improved system and method for effecting communication of secure information.

SUMMARY OF THE INVENTION

There is provided a system comprising a first device of a user and a second device of a user, in which a user carries out a secure communication utilising a user interface of the second device, wherein the secure communication process sends a request to a user interface of the first device, and the secure communication process is completed in dependence on a response to the request which is not transmitted from a user interface of the second device.

Thus the transaction process does not depend only on a transmission to a device separate to the device being used for the transaction, but depends on that device making a transmission.

The request to the user interface of the first device causes the user interface to display information to the user. The information preferably request the user to provide an input.

In one example a single additional device is provided, and the response is transmitted from a user interface of the single device. The user interface of the single device thus is configured to display a request to a user and is configured to receive an input from the user.

The additional device is ideally a wearable device which is attached to the user, such as a watch-type device.

The secure communication is to make a purchase associated with video content.

The system may further comprise a third device of a user. The request is sent to a user interface of the first device, and the response is sent from a user interface of the third device. There is thus provided two devices in addition to the main device for displaying content.

The first device may be interactive glasses and the third device may be a watch type device. The display part of the user interface of the interactive glasses is used, and the input part of the user interface of the watch-type device is used.

The secure communication may comprise a payment transaction. The secure communication may comprise a log-in. The secure communication may comprise an authentication/authorisation process.

There may be provided a server for controlling the secure communication process. The server may be connected to the second device, and the second device may be connected to the first device. Thus any communication between the server and the second device may be direct, and any communication between the server and first device may be via the second device.

The first device may be associated with a third device. Any communication to the first device may be via the third device. The third device is not involved in the secure communication process other than to facilitate communication to the first device. An example here is that the first device is a watch and the third device is an associated phone, to which the watch is an accessory. The user interface of the watch is used for a secure communication conducted on the user interface of the second device, such as a tablet or television. In this example the phone is not part of the secure communication process, but may forward signals to from the watch. The third device thus may facilitate communication between the first and second devices.

There is provided a method of secure communication for a system comprising a first device of a user and a second device of a user, the method comprising a user carrying out a secure communication utilising a user interface of the second device, wherein the secure communication method comprises sending a request to a user interface of the first device, and the secure communication process is completed in dependence on receiving a response to the request which is not transmitted from a user interface of the second device.

The method comprises transmitting the request to the user interface of the first device to cause the user interface to display information to the user. The information preferably requests the user to provide an input.

The method may comprise transmitting the request to a single additional device, and receiving the response from the user interface of the single device. The method thus configures the user interface of the single device to display a request to a user and to receive an input from the user.

The method may comprise communicating with a third device of a user. The request is sent to a user interface of the first device. The method may comprise receiving the response from a user interface of the third device. There is thus provided two devices in addition to the main device for displaying content.

The method may utilise a display part of the user interface of interactive glasses, and the input part of the user interface of a watch-type device.

The method may provide a server for controlling the secure communication process. The method may connect the server to the second device, and the method may connect the second device to the first device.

The method may associate the first device with a third device. Any communication to the first device may be via the third device. The third device may not be involved in the secure communication process other than to facilitate communication to the first device. An example here is that the first device is a watch and the third device is an associated phone, to which the watch is an accessory. The user interface of the watch is used for a secure communication conducted on the user interface of the second device, such as a tablet or television. In this example the phone is not part of the secure communication process, but may forward signals to from the watch. The third device thus may facilitate communication between the first and second devices.

BRIEF DESCRIPTION OF THE DRAWINGS

The invention is now described by way of example with reference to the accompanying drawings, in which.

DESCRIPTION OF PREFERRED EMBODIMENTS

Figure 1:
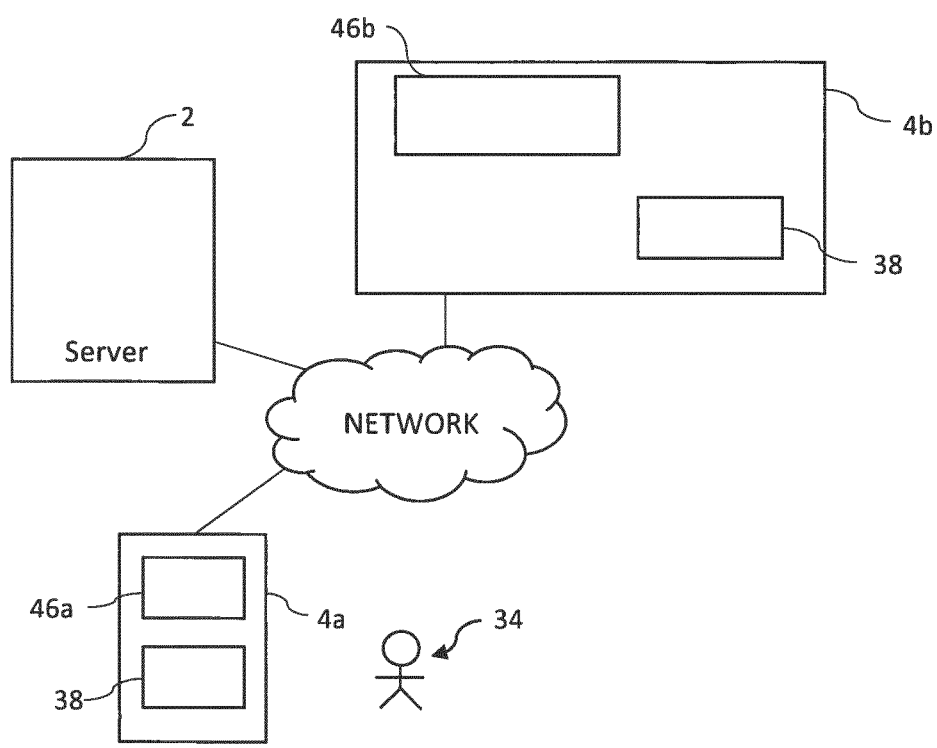
FIG. 1 is a schematic bock diagram illustrating the connection of two devices in a first example.

The invention is described by way reference to examples, but is not limited to features of these examples which are referred to for assisting in describing the invention.

A user may utilise interactive devices and services with two devices, with one device being an accessory to the other.

For example a user may watch video content on the display of a device, such as on the display of a tablet device. A user may utilise a user interface to control the delivery of video content. Such a user interface may be provided by the device. For example a touch-screen of a tablet device which displays video content, may also be used for displaying menu options to a user and detecting user inputs.

Wearable technology covers a broad range of personal devices from health tracking gadgets to watches and glasses. Devices in this class come in a variety of form factors each tailored to a particular use case: glasses, a watch, a clip on pedometer, blood pressure and heart rate straps, and clothing fabrics that include sensing functions.

The size of most wearable devices means that they are unable to contain the full complement of communication technology to support communication methods that are provided by a phone or a tablet for example. Moreover, it may not be beneficial for wearable devices to operate independently of other devices. For this reason, wearable devices typically function as accessories to other devices rather than as standalone devices in their own right. Communication between wearable accessories and associated phone/tablet devices may be via a direct radio connection such as Bluetooth, or via a network connection such as WiFi. Bluetooth is the most typical form of direct radio communication because of its low power consumption profile.

A smart watch, for example, may act as an alternate display and interaction console for an associated second device, such as a large display device such as a tablet. These devices together can be used by a user to navigate the ecosystem of content around them, reinforcing the accessory role a watch fulfils. Where a phone or tablet can may be used to perform fine detailed actions, a watch may be used to allow the user to engage quickly.

The limited screen real estate of a watch-type device and the small amount of bandwidth available to it makes direct consumption of content impractical. The use of a watch-type device in consumption of content is therefore in addition to a device on which the content is displayed. The watch-type device can be used to provide convenience and to personalise access to content.

A watch-type device is likely to be one of the most personal devices a user owns in the ecosystem of consumer devices. Whilst smaller devices such as a tablet or phone are likely to be personally owned, they may be shared by others, and they may also be left in locations distinct from the users location. Interactive glasses are more likely to be kept with a user because they are worn, but as with a phone it is possible that they are left separate to the user or that the user is not always interacting with them. A watch-type device occupies a unique position in the ecosystem because it does not interfere with the user doing other tasks, and is more likely to always be attached to the user.

The personal nature of a watch-type device may be used to enhance secure communication.

Arrangements utilise the role of a smart watch within a video and related media ecosystem in relation to secure communication. The arrangements apply to devices other than a watch-type device, and are not limited in their applicability to use with a watch-type device, although they find particularly advantageous applicability when applied to a watch-type device.

The examples disclosed herein relate to the use of a watch-type device in conjunction with a tablet device, but in general they relate to the use of any two devices which are in communication. The communication between the two devices may be controlled by one of the two devices, or there may be provided a third device such as a server which controls one or both of the devices.

The examples utilise the architecture of two interconnected devices, such as a main device and an accessory device, to facilitate secure communication.

FIG. 1 illustrates a first device 4a, a second device 4b, and a server 2. The first and second devices 4a, 4b and the server 2 are illustrated as being connected by a network. The first device 4a has a processing engine 38 and a user interface 46a. The second device 4b has a processing engine 38 and user interface 46b. The devices 4a, 4b are each associated with a user 34.

The device 4a may be a watch-type device such as a smart watch. The device 4b may be a tablet or other larger screen device. Both devices operate under the control of the server 2, with the server 2 controlling the association of the devices 4a, 4b with the user 34.

The network 2 is illustrative, and the server 2 and the devices 4a, 4b may communicate by any appropriate technique, for example by direct communication rather than by the network, or the communication between two devices may be on a distinct network. Alternatively one of the devices 4a, 4b may be connected to the network, the other of the devices 4a, 4b being connected to the network connected device by a radio link. For watch-type devices, the device is generally associated with and connected to a smart phone device. Thus the use of a watch type device in a communication may inherently involve the use of the associated smart phone, even when the communication is being conducted with a different device such as a tablet.

Figure 2:
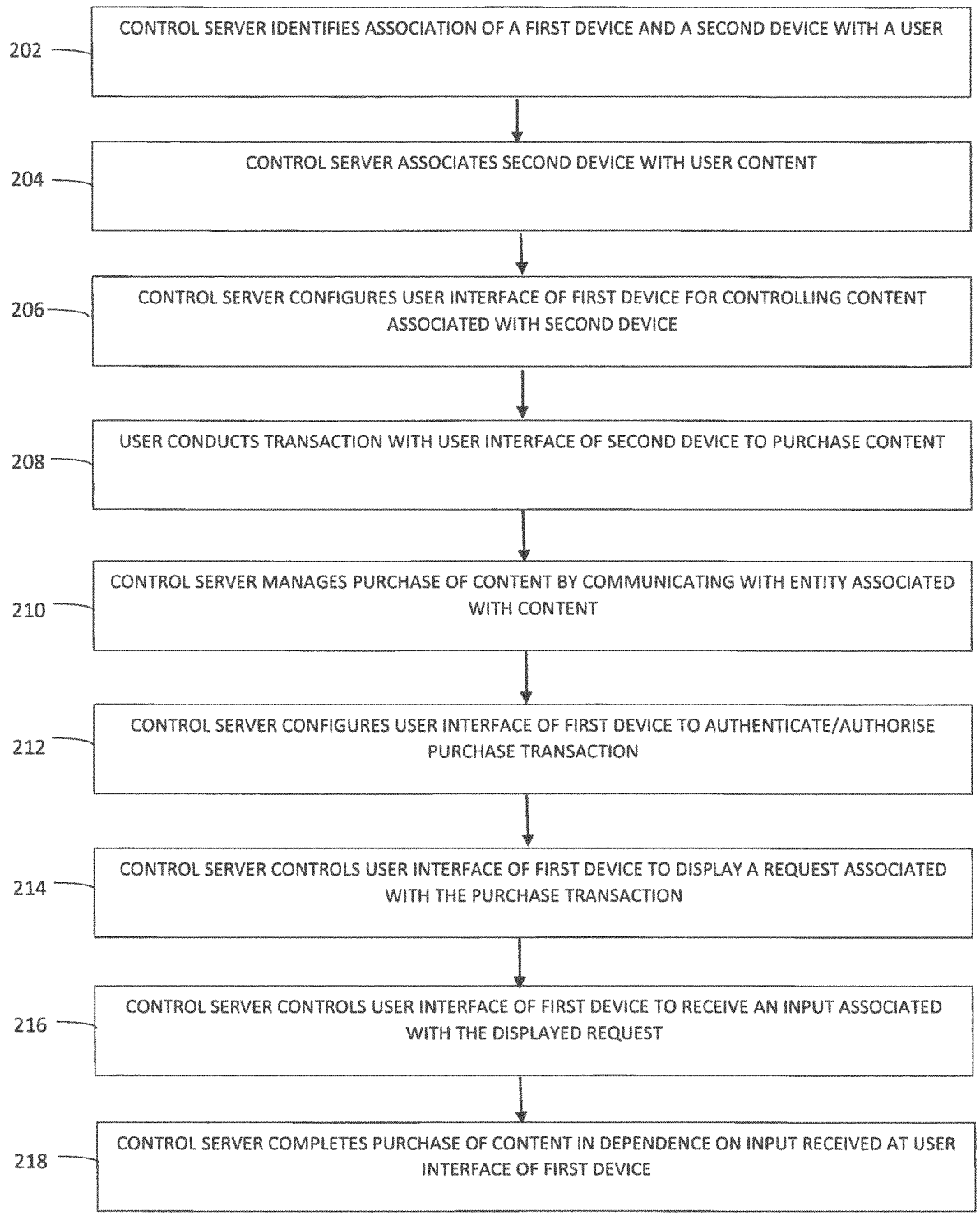
FIG. 2 is a first example method flow for controlling a transaction.

With reference to FIG. 2, an example process associated with the architecture of FIG. 1 is illustrated.

As denoted in step 202, the server 2 is connected to the first device 4a and the second device 4b, and associates each of the first and second devices 4a, 4b with a particular user 34. As denoted by step 204, the server 2 also associates the second device 4b with user content. This association may allow the second device 4b to access and play any content associated with the user 34, and may also allow the second device 4b to be used by the user 34 to purchase additional content.

The server 2 configures the user interface of the first device 4a, as denoted by step 206, to control the content associated with the second device 4b. This allows the user interface of the first device 4a to remotely control the content associated with the second device 4b. Thus when content is displayed on the display of the second device 4b, the user interface of the first device 4a is configured to control that content. When the content displayed is programme content, for example, the user interface of the first device 4a may provide a remote control to play, pause, fast forward etc. the content.

In an example, as denoted by step 208, a user conducts a transaction to purchase content using the user interface of the second device 4b. A transaction to purchase content is an example of a secure communication.

The server 2 manages the purchase of content by the user 34. The second device 4b is connected to the server 2, and the user's interaction with the user interface associated with the second device 4b to purchase content is managed by the server 2. As denoted by step 210, the server 2 communicates with an entity associated with the content being purchased to purchase the content. The user interface of the first device or the second device may be used for this interaction with the display of the second device.

The server 2 additionally configures, as denoted by step 212, the user interface of the first device 4a to authenticate/authorise the purchase of the content. Specifically the server 2 configures the user interface of the first device 4a to display a request associated with the purchase. The server may directly communicate with the first device to achieve this, or the server may instruct the second device to communicate with the first device to achieve this.

Specifically, the server 2 controls the user interface of the first device 4a, as denoted by step 214, to display a request associated with the purchase transaction which is being conducted utilising the user interface of the second device. It is assumed here that the transaction is being initiated by the user interface associated with the second device, and associated information is displayed on the user interface of the second device. The display of the second device may display information related to the current status of the transaction, and may display a message for the user to check the user interface of the first device. In any event, a correspondence preferably exists between the two user interfaces, with the display of the second device at least providing a summary of the transaction.

Figure 3:
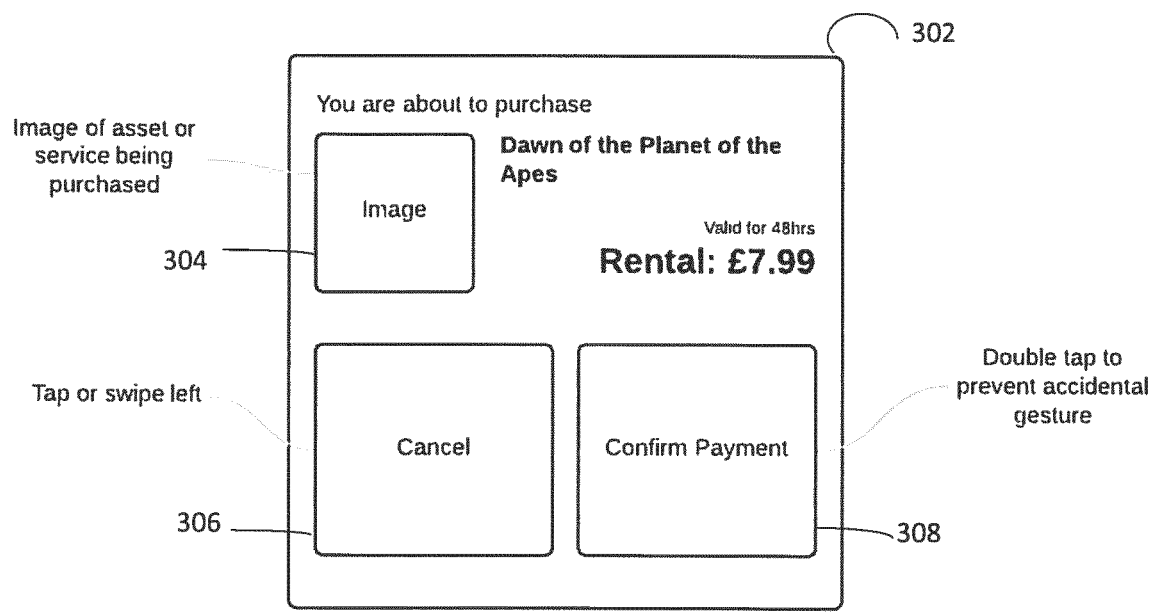
FIG. 3 is an example screen shot of a user interface of a first device in a first example.

FIG. 3 shows an example display of the user interface of the first device 4a. The display 302 includes a confirmation of the content which the user is about to purchase. Icon 304 illustrates an image associated with the purchase, for example an image associated with a film if a film is being purchased. The title of the film may also be shown alongside this icon.

Two additional icons are displayed. An icon 306 displays 'cancel' text, and an icon 308 displays 'confirm payment' text.

The transaction is then authorised/authenticated by detecting the user input at the user interface. In order to cancel the transaction, the icon 306 is selected. Preferably the icon is swiped or tapped to the left. In order to confirm the transaction, the icon 308 may be double tapping. Preferably some gesture other than a simple tap is used to select any icon, to avoid accidental gesture.

The input detected at the user interface of the first device 4a is sent to the server 2, and as denoted by step 216 the server 2 thus controls the user interface of the first device 4a to receive an input associated with the displayed content. Where the server is directly connected to the first device a signal associated with the user input is transmitted directly from the first device to the server. Alternatively the signal may be sent from the first device to the server via the second device.

As denoted by step 218, the server 2 then completes the transaction accordingly. Where the purchase has been confirmed, the content is downloaded and associated with the user, for example being downloaded to the second device.

Examples of purchased content may be to purchase a pay-per-view (PPV) event, or to upgrade a subscription through a Smart TV or set top box (STB).

The use of the user interface of the first device, to complement the purchase being made with the user interface of the second device, enables authorisation/authentication to be enhanced. The use of the additional authorisation from an additional device, which requires a transmission from the additional device to the server, provides a high degree of confidence that the requested transaction is approved by the bill payer.

The first device is preferably a watch-type device. As a watch is typically always attached to a user, an alert shown on it such as the display on the user interface as shown in FIG. 3 prompts a known user to confirm a transaction.

The authorisation/authentication process provides a convenient and natural interaction process when used with a watch-type device. For example a tablet screen or a television screen displays a transaction summary, and the watch provides the opportunity to approve or decline the transaction.

In this way, a secure communication is provided utilising two interconnected devices.

A modification to this technique configures the transaction at the second device to be authenticated/authorised using the user interfaces of two additional devices rather than one. In an example the display part and input part described above when using the user interface of the first device is split into two, with the display part being provided on the user interface of one device, and the input part being provided at the user interface of another device.

Figure 4:
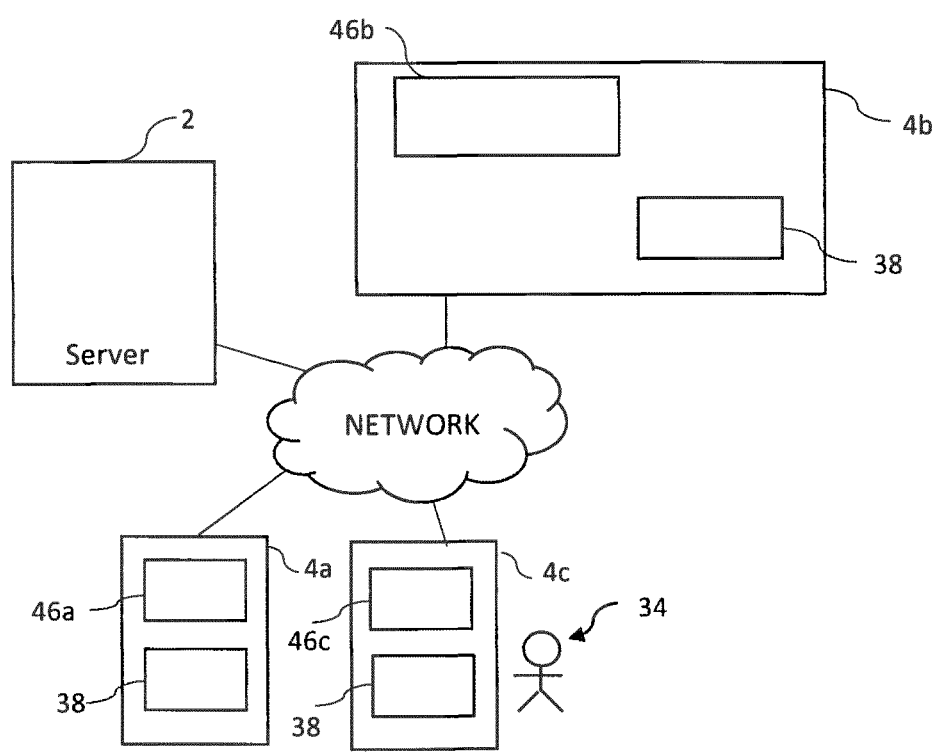
FIG. 4 is a schematic bock diagram illustrating the connection of two devices in a second example.

In this arrangement the architecture of FIG. 1 is adapted, as shown in FIG. 4, to include a third user device 4c. The third user device 4c includes a processing engine 38 consistent with the other devices, and a user interface 46c. The third user device 4c is associated with the user 34, and in the example is connected to the network.

Figure 5:
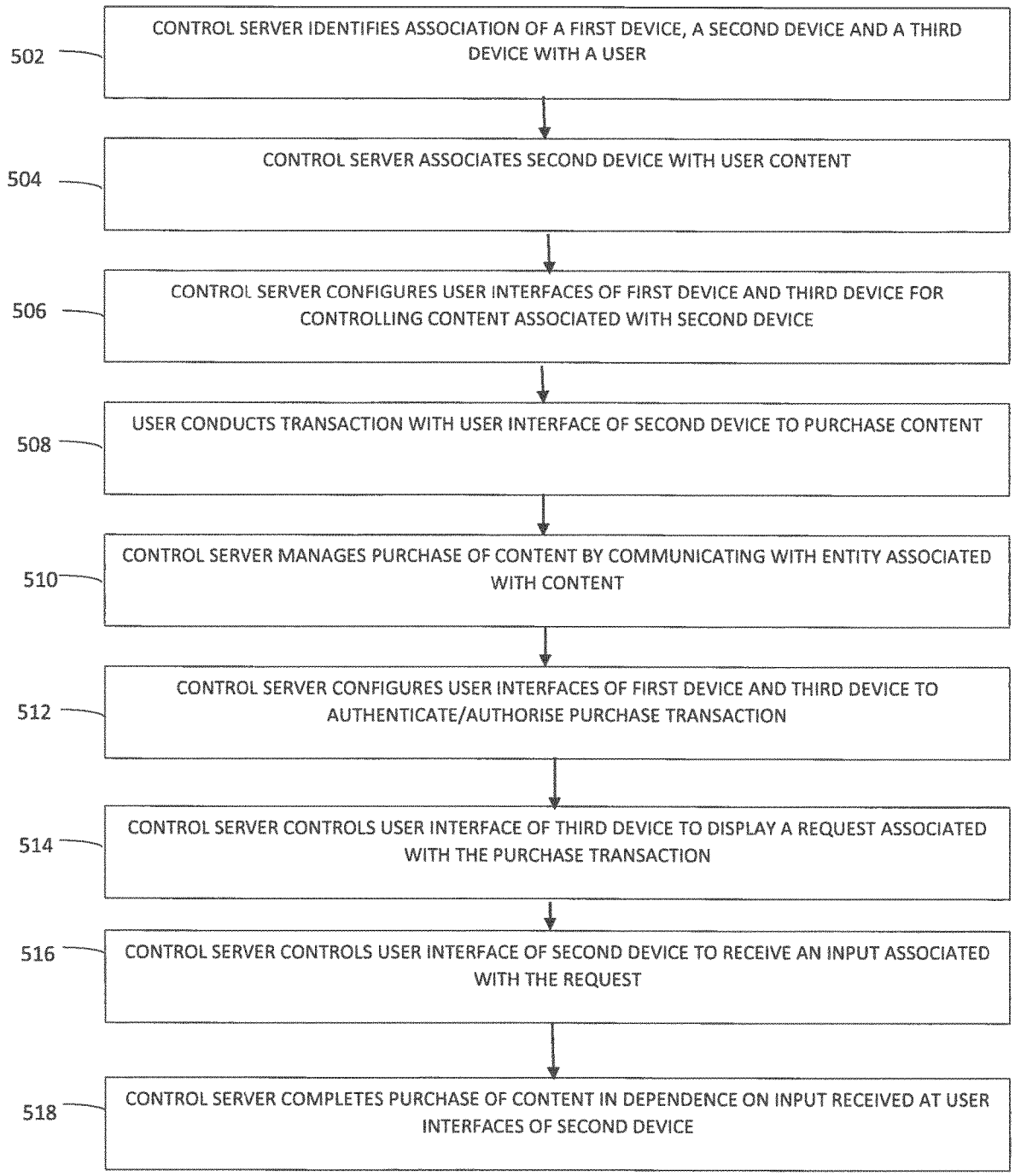
FIG. 5 is a second example method flow for controlling a transaction.

With reference to FIG. 5, an example process associated with the architecture of FIG. 4 is illustrated.

As denoted in step 502, the server 2 is connected to the first device 4a, the second device 4b and the third device 4c, and associates each of the first, second and third devices 4a, 4b, 4c with a particular user 34. As denoted by step 504, the server 2 also associates the second device 4b with user content. This association may allow the second device 4b to access and play any content associated with the user 34, and may also allow the second device 4b to be used by the user 34 to purchase additional content.

The server 2 configures the user interfaces of the first device 4a and the third device 4c, as denoted by step 206, to control the content associated with the second device 4b. This allows the user interfaces of the first and third devices 4a, 4c to remotely control the content associated with the second device 4b. Thus when content is displayed on the display of the second device 4b, the user interfaces of the first and third device 4a, 4c are configured to control that content. When the content displayed is programme content, for example, the user interfaces of the first and third devices 4a, 4c may provide remote controls to play, pause, fast forward etc. the content.

In this example, as denoted by step 508, a user again conducts a transaction to purchase content using the user interface of the second device 4b.

The server 2 manages the purchase of content by the user 34. The second device 4b is connected to the server 2, and the user's interaction with the user interface associated with the second device 4b to purchase content is managed by the server 2. As denoted by step 510, the server 2 communicates with an entity associated with the content being purchased to purchase the content.

The server 2 additionally configures, as denoted by step 512, the user interface of the first and third devices 4a, 4c to authenticate/authorise the purchase of the content.

In this example the server 2 configures the user interface of the third device 4c to display a request associated with the purchase. Specifically, the server 2 controls the user interface of the third device 4c, as denoted by step 514, to display a request associated with the purchase transaction. The server transmits an appropriate signal to the user interface of the third device directly, or via the second device which has a direct radio connection to the third device.

In an example, the third device is interactive glasses, and the server 2 controls the interactive glasses to display an option associated with the purchase. At the same time the display of the second device may prompt the user to make a selection based on the information displayed on the interactive glasses.

Figure 6A:
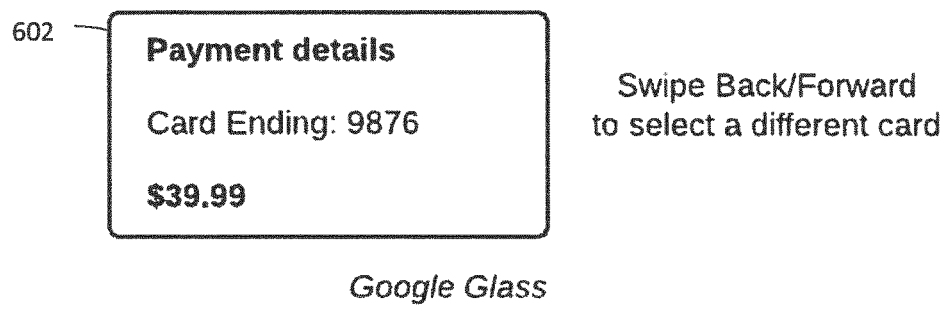
FIGS. 6(a) and 6(b) are example screen shots of user interfaces in accordance with the second example.

FIG. 6(a) shows an example display of the user interface of the third device 4c. The display 602 includes a confirmation of the content which the user is about to purchase. Associated with the icon confirming the purchase is, in this example, text advising the action to be taken by the user to confirm the purchase.

Figure 6B:

At the same time the display associated with the second device displays information as shown in FIG. 6(b). This display 604 may display an icon representing an image of the purchase, and an icon requesting confirmation that the user will check information displayed on the user interface display of the interactive glasses.

In the example the user is advised by the display of the interactive display to swipe back/forward to select a different card, and the user may thus adapted the displayed information accordingly.

In an example, the transaction is then confirmed by the user providing an input at the user interface associated with the first device to confirm the purchase. The user selection of an appropriate input at the first device results in a signal being sent to the server, directly or via a connection to the second device.

The transaction is then authorised/authenticated by detecting the user input at the user interface. The input detected at the user interface of the first device 4a is sent to the server 2, and as denoted by step 516 the server 2 thus controls the user interface of the first device 4a to receive an input associated with the displayed content.

As denoted by step 518, the server 2 then completes the transaction accordingly. Where the purchase has been confirmed, the content is downloaded and associated with the user, for example being downloaded to the second device.

Thus as described the transaction may be authorised by an additional device or devices, with the user interface functionality being spread amongst the plurality of additional devices when additional devices are used.

Whether a single device or multiple additional devices are used, an additional signal is sent back from the device or additional devices to the server to provide authorisation or authentication of a transaction.

In this way, a secure communication is provided utilising three interconnected devices. In general, a secure communication is provided utilising at least two interconnected devices.

In an example an additional device may be utilised which simply facilitates communication and is not part of the secure communication process. For example where a watch type device is associated with a smart phone, any communication with the watch type device may be via the smart phone, even when the user interface of the smart phone is not being utilised. For example a transaction may be conducted utilising the user interface of a second device, such as a tablet, and a communication may be sent to the watch type device, either by the server or by the second device, via the smart phone. This may be understood with further reference to FIG. 4. The additional device shown, 4c, may be a smart phone associated with the watch (being the first device 4a). In such case the phone 4c plays no active role in the secure communication. In modifications, even in such scenario the communication may bypass the smart phone associated with the watch, and allow the watch to communicate directly with the tablet (or television) for the purpose of effecting the transaction.

In embodiments a purchase transaction is a purchase transaction associated with video content, but the transaction may be an alternative type of purchase transaction.

The examples relate to a purchase transaction, but in general apply to a secure communication of any type.

For example the secure communication may be a log-in. Log-in information is provided using the user interface of the second device, such as a tablet, and then a signal is sent to the user interface of the first device, such as a watch, to request an additional user input. In response to that additional user input at the first device, which may simply be a swipe or a double tap, the log-in is completed.

For example the secure communication may be associated with an authentication/authorisation process. For example an authentication/authorisation process may utilise the transmission of encrypted messages.

The examples describe a secure communication technique which allows the communication to be completed using an individual device, such as a watch or interactive glasses, rather than a shared device, such as a television. The individual device is a personal device, which is likely to be rarely away from the associated user.

When a user is using interactive glasses, the server may choose to send the information associated with a credit card transaction, or any information which is of a secure nature, to the display of the interactive glasses rather than displaying the information of the screen. Credit card information may be displayed, as shown in FIG. 6(a), on the display of the interactive glasses rather than the display of the second device. The system may be adapted such that on detection of the use by the user of interactive glasses, all information of a secure nature is displayed on the interactive glasses.

Where a user is using interactive glasses and has an interactive watch-type device, the display of the glasses may advantageously be used with inputs being provided by the watch.

Examples have been described herein, but it is to be understood that the invention is not limited to details of those examples. Details of any examples herein may include the details of any or all other examples in any combination.

In addition methods and computer programs for implementing the method are contemplated. Any method or computer program may be implemented in a server controlling a device or devices, in a device, in a combination of a server and a device, in a combination of devices, or in a combination of a server and devices.

Various other changes and modifications may be made by one skilled in the art without departing from the scope or spirit of the invention.

The invention claimed is:

1. A system comprising:
    a first device of a user, the first device having a user interface;
    a second device of the user, the second device having a user interface; and
    a server configured to:
        store an association between each of the first device, the second device and the user;
        store an association of the second device with user content;
        arrange the user interface of the first device as a remote control for the content associated with the second device, such that when content is displayed on the second device, the user interface of the first device controls that content,
        wherein the user initiates a secure communication process at the user interface of the second device to initiate a transaction at the server, wherein in response the server is further configured to:
        retrieve the stored association identifying the first device associated with the second device for the user;
        send a request from the server to the first device identified by that stored association for display on the user interface of the first device; and
        receive a detected user input at the user interface of the first device;
        wherein responsive to the detected user input at the user interface of the first device being a confirmation, the server is further configured to complete the transaction for the user, initiated by the second device, at the server.

2. The system of claim 1 wherein the first device is operably connected to the second device to control content associated with the second device.

3. The system of claim 1 wherein the transaction is initiated at the user interface of the second device, and associated information is displayed on the user interface of the first device, and wherein the server is additionally configured to display a message on the user interface of the second device to check the user interface of the first device.

4. The system according to claim 1 in which the secure communication process comprises at least one of: an authentication/authorisation process; a payment transaction; and a log-in.

5. The system of claim 1 in which the first device is a watch-type device.

6. The system of claim 1 wherein the first device is configured, responsive to the request received at the first device from the server, to process the transaction.

7. The system of claim 1 wherein the second device is a device shared by multiple users, for viewing of content by the multiple user including the user, and the first device is a device personal to the user, for viewing of content to the user.

8. A system comprising:
    a first device of a user, the first device having a user interface;
    a second device of the user, the second device having a user interface;
    a third device of the user, the third device having a user interface, wherein the user interfaces of the first and third devices control the second device;
    a server configured to store an association between each of the first device, the second device, the third device and the user wherein the server is further configured to arrange the user interface of the first device as a remote control for the content associated with the second device, such that when content is displayed on the second device, the user interface of the first device controls that content;
    in which, in the system, the user initiates a secure communication process with the server at the user interface of the second device, wherein in response the server:
    is configured to retrieve the stored association identifying the first device and third device associated with the second device for the user,
    is configured to configure the user interfaces of the first and third devices to authenticate and authorize the secure communication process, by:
        configuring the user interface of the third device to display a request associated with the secure communication initiated at the user interface of the second device,
        sending a request from the server to the third device identified by the stored association, to display a request associated with the secure communication, and
        detecting a selection at the user interface of the first device responsive to that request displayed on the user interface of the third device;
    further wherein in response, the server is responsive to the selection detected at the user interface of the first device to confirm the secure communication process initiated by the second device,
    wherein confirmation completes the transaction for the user, initiated by the second device, at the server.

9. The system of claim 8 wherein the user interfaces of the first and the third devices are configured to control the content of the second device.

10. The system of claim 8 wherein the user interface of the second device prompts the user to make a selection based on information displayed on the user interface of the third device.

11. The system according to claim 8 in which the first device is interactive glasses and the third device is a watch type device.

12. A method of secure communication for a system comprising a first device of a user, a second device of the user, and a server, the method performed at the server and comprising:
    arranging a user interface of the first device as a remote control for the content associated with the second device, such that when content is displayed on the second device, the user interface of the first device controls that content;
    initiating a secure communication process by the user at a user interface of the second device;
    accessing a store of associations, in which an association between each of the first device, the second device, and the user is stored;

retrieving an association between the first device and the second device for the user;

retrieving an identity of the first device associated with the second device and the user from the store;

sending a request from the server to the first device based on that association, for display on the user interface of the first device;

receiving a detected user input at the user interface of the first device; and completing the secure communication process responsive to the user input detected at the user interface of the first device being a confirmation.

13. The method of claim 12 wherein the request to the first device causes the user interface of the first device to display information to the user.

14. The method of claim 12 further comprising associating the first device with a third device.

15. The method of claim 12 further comprising processing the transaction at the first device based on a user input at the user interface.

16. A server for facilitating a secure communication with a second device of a user, wherein the server is configured to:

store an association between each of the second device, a first device of the user, and the user;

store an association of the second device with user content;

arrange the user interface of the first device as a remote control for the content associated with the second device, such that when content is displayed on the second device, the user interface of the first device controls that content;

receive a request for the secure communication entered by the user at a user interface of the second device;

retrieve an identity of the first device based on the stored association to identify the first device associated with the second device;

control a user interface of the first device to display a request associated with the secure communication based on the association;

receive an input detected at the user interface of the first device entered by the user; and responsive to the input detected at the user interface of the first device being a confirmation, complete the secure communication for the user initiated by the second device with the second device.

17. A method of secure communication for a system comprising a first device of a user, a second device of the user, a third device of the user, and a server, the method performed at the server and comprising:

arranging the user interface of the first device and the user interface of the third device as remote controls for the content associated with the second device, such that when content is displayed on the second device, the user interfaces of the first and second devices controls that content;

initiating a secure communication process by the user at a user interface of the second device;

accessing a store of associations at the server, in which an association between each of the first device, the second device, the third device and the user is stored;

retrieving the stored association identifying the first and third devices associated with the second device for the user, configuring the user interfaces of the first and third devices to authenticate/authorize the secure communication process, by:

configuring the third device to display a request associated with the secure communication, and sending a request from the server to the third device identified by that association, to display a request associated with the secure communication, and detecting a selection at the user interface of the first device;

confirming the secure communication process is responsive to the selection detected at the user interface of the first device, completes the transaction for the user responsive to the confirmation.

18. The method of claim 17 further comprising arranging the user interface of the first device as a remote control for the content associated with the second device, such that when content is displayed on the second device, the user interface of the first device controls that content.

19. A server for facilitating a secure communication with a second device of a user, wherein the server is configured to:

store an association between each of the second device, a first device of the user, a third device of the user, and the user;

store an association of the second device with user content;

arrange a user interface of the first device as a remote control for the content associated with the second device, such that when content is displayed on the second device, the user interface of the first device controls that content;

initiating a secure communication process by the user at a user interface of the second device;

accessing a store of associations at the server, in which an association between each of the first device, the second device, the third device and the user is stored;

retrieving the stored association identifying the first and third devices associated with the second device for the user, configuring the user interfaces of the first and third devices to authenticate/authorize the secure communication process, by:

configuring the third device to display a request associated with the secure communication, and sending a request from the server to the third device identified by that association, to display a request associated with the secure communication, and detecting a selection at the user interface of the first device;

confirming the secure communication process is responsive to the selection detected at the user interface of the first device, completes the transaction for the user responsive to the confirmation.

* * * * *